United States Patent

Loosme

[15] 3,638,163

[45] Jan. 25, 1972

[54] CONNECTOR FOR ELECTRICALLY INTERCONNECTING TWO PARALLEL SURFACES

[72] Inventor: Oskar Loosme, Lincroft, N.J.

[73] Assignee: Bell Telephone Laboratories, Incorporated, Murray Hill, N.J.

[22] Filed: July 20, 1970

[21] Appl. No.: 56,341

[52] U.S. Cl. .......................... 339/17 M, 339/17 C, 339/18 C, 339/59 M, 339/174

[51] Int. Cl. .......................... H05k 1/02

[58] Field of Search .......................... 339/59, 60, 61 R, 61 M, 18 R, 339/18 C, 18 P, 19, 17 M, 17 F, 17 R, 17 C, 17 L, 17 LM, 17 LC, 210 R, 210 M, 198 C, 198 E, 198 K, 174, 75 MP

[56] References Cited

UNITED STATES PATENTS

| | | | |
|---|---|---|---|
| 2,265,846 | 12/1941 | Krantz | 339/212 X |
| 2,854,552 | 9/1958 | Gouverneur | 339/19 X |
| 3,148,356 | 9/1964 | Hedden, Jr. | 339/17 CF X |
| 3,208,029 | 9/1965 | Leslie | 339/19 |
| 3,221,286 | 11/1965 | Fedde | 339/59 M X |
| 3,430,182 | 2/1969 | Blanche | 339/59 X |

*Primary Examiner*—Marvin A. Champion
*Assistant Examiner*—Terrell P. Lewis
*Attorney*—R. J. Guenther and Kenneth B. Hamlin

[57] ABSTRACT

A universal, mass-producible connector which conducts electrical currents between conductive strips on uniformly spaced surfaces comprises a nonconductive body bearing on its periphery a plurality of conductive contacts. The device is conformable to curved, as well as flat, surfaces and facilitates assembly and disassembly of printed and integrated circuit structures without damage to mounted electrical components.

7 Claims, 8 Drawing Figures

INVENTOR
O. LOOSME
BY
J. B. Kearns
ATTORNEY

CONNECTOR FOR ELECTRICALLY INTERCONNECTING TWO PARALLEL SURFACES

FIELD OF THE INVENTION

This invention relates to electrical connectors in general and in particular to devices for interconnecting uniformly spaced conductive surfaces such as are found on integrated circuit ceramic substrates and printed circuit boards.

BACKGROUND OF THE INVENTION

Circuit packaging density increases as more low-power devices become available. The change to integrated circuit ceramic substrates for both digital and analog circuits has become economically advantageous. Since a substrate contains a large number of integrated circuits, typically 10 to 20, it is desirable that the substrate be easily removable from a printed circuit board for troubleshooting. Similar disconnect capability is also desirable for piggyback or stacked arrangements of interconnected printed circuit boards. Generally, printed circuit boards comprise an electrically insulating base material, which can be rigid or semirigid, and flat strips of electrically conductive material deposited or printed on at least one surface thereof.

It is an object of this invention to provide a universal connector for electrically connecting circuits on two printed circuit boards.

It is another object of this invention to provide a universal connector for connecting conductive strips on an integrated circuit ceramic substrate to conductive strips on a printed circuit board.

It is yet another object of this invention to provide a universal connector for interconnecting stacked printed circuit boards without resort to soldering techniques.

It is a still further object of this invention to provide a universal connector for simultaneously connecting a plurality of integrated ceramic substrates to a printed circuit board.

It is another and further object of this invention to provide a universal connector and a method of mounting and retaining such connector on a printed circuit board.

SUMMARY OF THE INVENTION

According to the present invention, a universal connector for interconnecting conductive strips on two uniformly spaced surfaces generally comprises a nonconductive connector body and a plurality of contacts arranged in parallel-spaced relationship along the length of the connector body.

According to a first illustrative embodiment of the invention, the universal connector comprises a nonconductive resilient tube and a plurality of narrow circular strips printed onto the external surface of said tube. In this embodiment the necessary contact force is provided by the resilient tube.

According to a second illustrative embodiment of the invention, the universal connector comprises a nonconductive rectangular block and a plurality of parallel spring contacts projecting in the same direction from said block. In this embodiment the necessary contact force is provided by the spring contacts.

It is an advantage of this invention that it allows easy assembly and disassembly of an integrated ceramic substrate from a printed circuit board structure without harm to adjacent integrated ceramic substrates.

It is another advantage of this invention that it facilitates interchange and replacement of integrated ceramic substrates.

It is a further advantage of this invention that it can be mass-produced.

It is a still further advantage of this invention that integrated circuit ceramic substrates do not require lead frames attached thereto.

It is a still further advantage of this invention that electrical connections can be made in the middle of a printed circuit board.

It is a feature of this invention that the necessary contact force can be provided by means of the electrical spring contacts or by means of the resilient nonconductive connector body.

It is another feature of this invention that a redundant number of contacts is provided in proportion to the conductive strip width.

It is a further feature of this invention that it is adaptable to an infinite number of center-to-center spacings of the conductive strips.

It is a still further feature of this invention that it is adaptable to conductive strips on flat or curved surfaces.

DESCRIPTION OF THE DRAWING

The above and other objects, advantages and features of this invention are better appreciated by a consideration of the following detailed description and the drawing in which.

DETAILED DESCRIPTION

Figure 1:
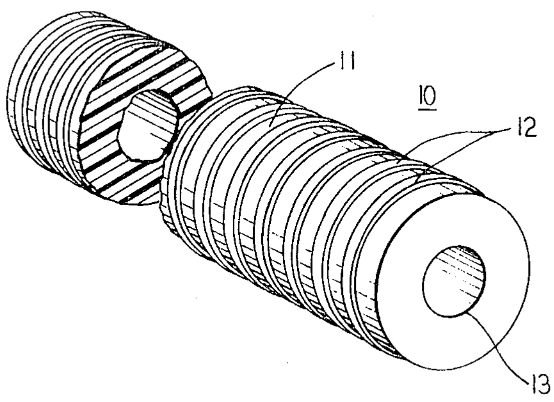
FIG. 1 is a perspective view of a first illustrative embodiment of a universal connector according to the present invention.

FIG. 1 is a perspective view of a first illustrative embodiment of a universal connector according to the present invention. Connector 10 comprises nonconductive resilient tube 11 having axial hole 13 and contacts 12, which are is parallel and equally spaced longitudinally along the cylindrical surface of tube 11. Tube 11, which can be made of rubber or Teflon, provides the necessary contact force when subjected to radial compression. Hole 13 is utilized to mount connector 10 to a respective printed circuit board. Contacts 12, which are advantageously etched foil contacts such as gold-plated copper, provide the electrical conduction path between the respective conductive strips to be interconnected.

Figure 2:
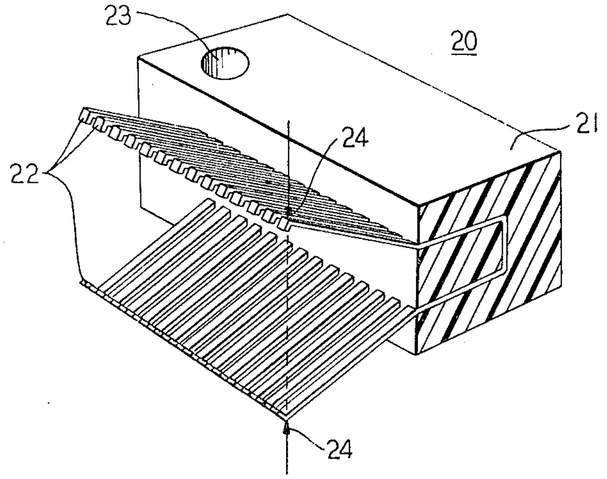
FIG. 2 is a perspective view of a second illustrative embodiment of a universal connector according to the present invention.

FIG. 2 is a perspective view of a second illustrative embodiment of a universal connector according to the present invention. Connector 20 comprises nonconductive rectangular block 21, which can be made of molded plastic, having bores 23. Bores 23 are utilized to mount connector 20 to an associated print circuit board. Connector 20 further comprises spring contacts 22 which are in parallel and equally spaced along the length of block 21. Contacts 22, which are made of a springlike metal such as gold-plated phosphor-bronze, serve the dual purpose of providing the electrical conduction path between the respective conductive strips to be interconnected and the necessary contact force when such contacts are subjected to compression along line 24.

Figure 3A:
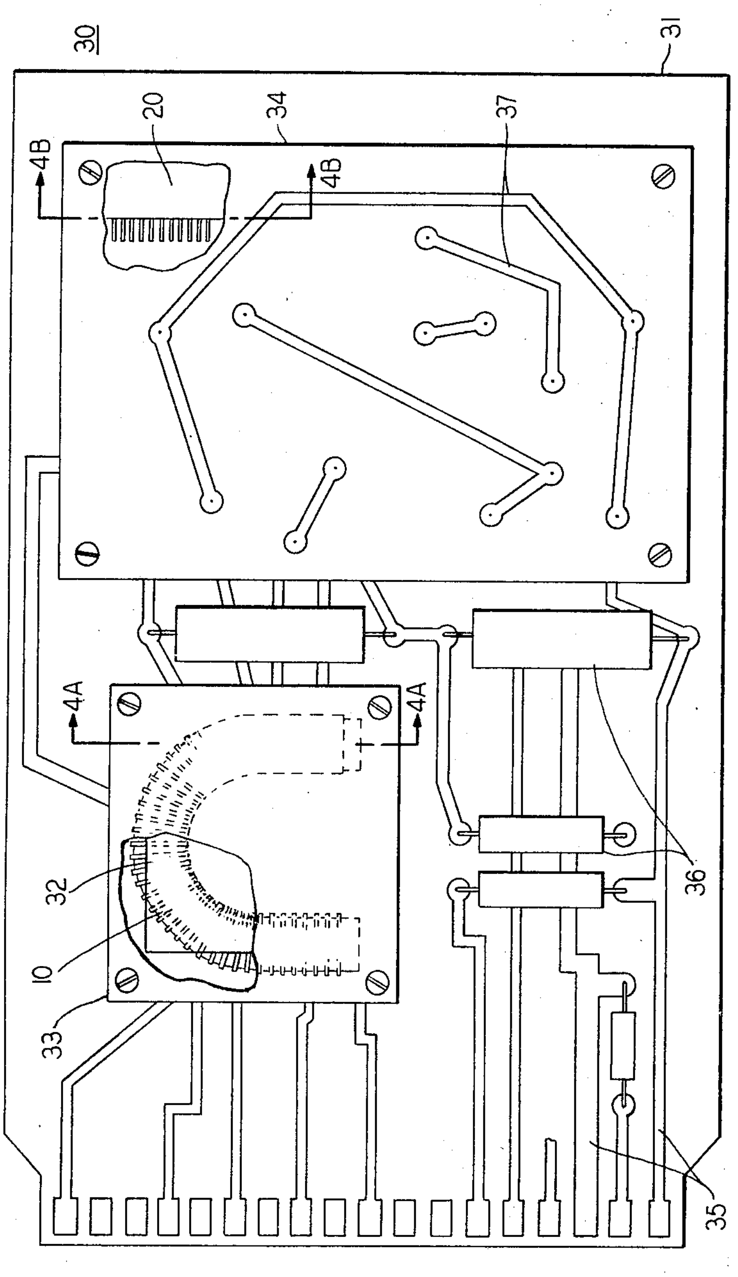
FIG. 3A is a top view, partially fragmentary, of a printed circuit board structure comprising an integrated circuit ceramic substrate and a piggyback printed circuit board according to the present invention.

FIG. 3A is a top view, partially fragmentary, of printed circuit board structure 30 comprising integrated circuit ceramic substrate 32 and piggyback printed circuit board 34. Board structure 30 additionally comprises conventional printed circuit board 31 and fixture 33, to which substrate 32 is mounted. Board 31 further comprises flat conductive strips 35 and conventional discrete electrical components 36, which may be capacitors or resistors. Board 34 further comprises flat conductive strips 37 on both sides thereof. The cutaway portion of fixture 33 shows connector 10 providing electrical connection between strips 35 on board 31 and conductive strips, not shown, on substrate 32. In addition, the cutaway portion of board 34 shows connector 20 providing electrical connection between strips 35 on board 31 and strips 37 on board 34.

Figure 3B:
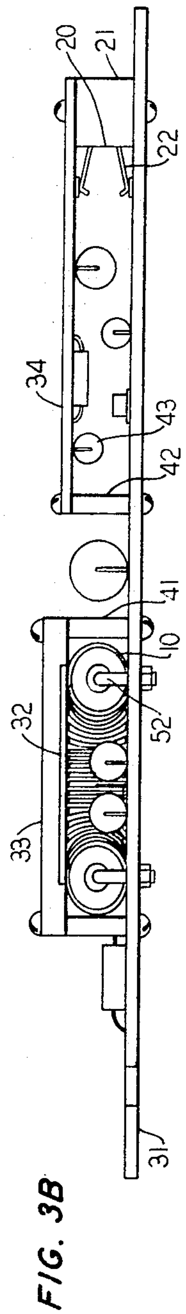
FIG. 3B is an edge view of the printed circuit board structure shown in FIG. 3A.

FIG. 3B is a front view of printed circuit board structure 30 further illustrating board 31, fixture 33, board 34, connector 10, connector 20, and substrate 32. Board 34 additionally comprises discrete electrical components 43. Connector 10 is disengageably attached to board 31 by means of retainer 52. Also, fixture 33 is disengageably attached to board 31 by means of spacers 41. The length of spacers 41 relative to the diameter of connector 10 is chosen such that there results adequate contact force at the interfaces of connector 10 with strips 35 and conductive strips, not shown, on substrate 32, respectively. In addition, board 34 is disengageably attached to board 31 by means of spacer 42 and block 21. The length of spacer 42 and the height of block 21 relative to the normal distance between the extremities of contacts 22 are chosen such that there results adequate contact force at the interfaces of connector 20 with strips 35 and strips 37, respectively.

Figure 4A:
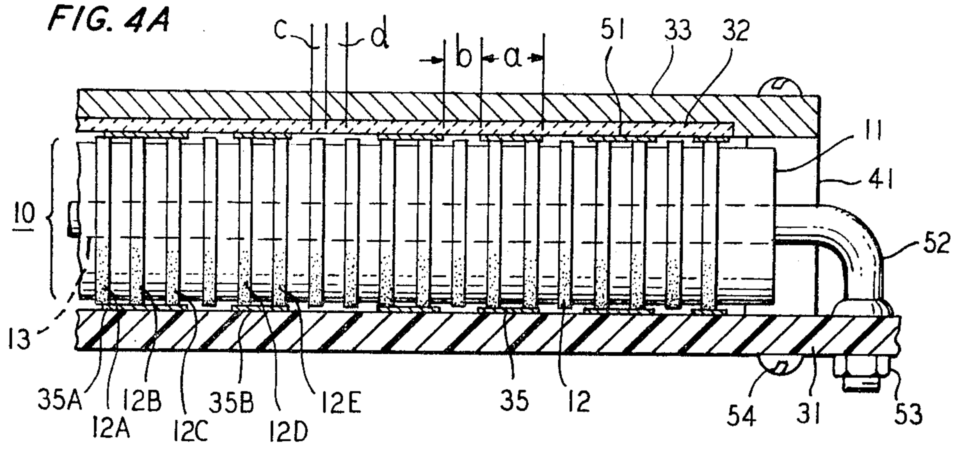
FIG. 4A is an enlarged sectional view taken along line 4–A of FIG. 3A and illustrating the connector of FIG. 1, which view is useful in explaining the relationships between conductor widths and spacings.

FIG. 4A is an enlarged sectional view taken along line 4–A of FIG. 3A. Tube 11, contacts 12, and axial hole 13 of connector 10 are shown. Also shown are board 31, with strips 35, fixture 33, and substrate 32, with strips 51. Fixture 33 is disengageably attached to board 31 by fastening means 54. Retainer 52, which attaches connector 10 to board 31, is curved and has one end which is threaded. The unthreaded end of retainer 52 inserts into axial hole 13 and the threaded end is fastened to board 31 by means of nut 53.

With reference to strip 35A, it can be seen that three contacts 12A, 12B, and 12C of connector 10 make contact with strip 35A of board 31. However, it can be seen that only two contacts 12D and 12E make contact with strip 35B. It is therefore apparent that the number of contacts touching a given flat conductive strip is proportional to the width of said strip. Therefore, the strips carrying the larger currents have associated therewith a proportionately larger number of contacts. This proportional relationship remains even though the center-to-center spacing of the strips is not constant.

The relationships which guarantee electrical conduction between contacts 12 and conductive strips 51 and which preclude electrical shorts due to bridging between adjacent strips 51 are derived with reference to FIG. 4A. First of all, in order to assure that at least one conduction path is provided between a contact 12 and a strip 51, the following relationship must be satisfied:

$$a>d,$$

where $a$ is the minimum width of a strip 51 and $d$ is the maximum spacing between two adjacent contacts 12. Otherwise, a strip 51 would fall between two adjacent contacts 12. Secondly, in order to insure that a contact 12 does not bridge two adjacent strips 51, the following relationship must be satisfied:

$$b>c,$$

where $b$ is the maximum spacing between two adjacent strips 51 and $c$ is the maximum width of a contact 12. Similar results are gotten for conductive strips 35. Also, a further inequality guaranteeing satisfactory alignment of strips 51, contacts 12, and strips 35 can be gotten in a similar manner.

Figure 4B:
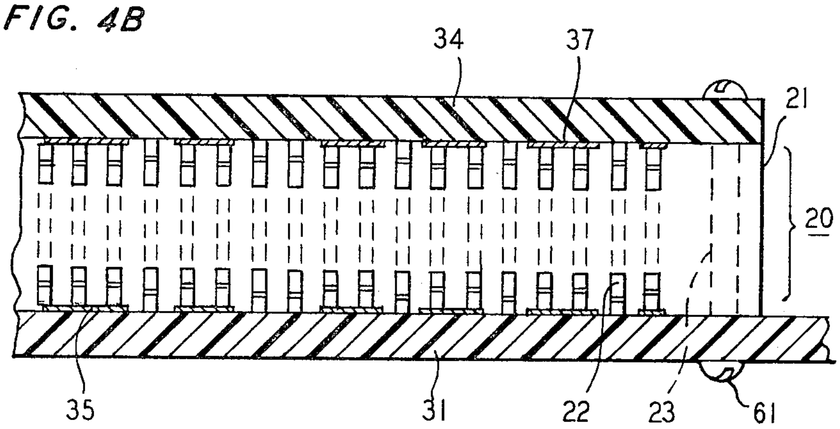
FIG. 4B is an enlarged sectional view taken along line 4–B of FIG. 3A.

FIG. 4B is an enlarged sectional view taken along line 4–B of FIG. 3A. Block 21, contacts 22, and bores 23 of connector 20 are shown. Also shown are board 31, with strips 35, and piggyback board 34 with strips 37. Fastening means 61 are utilized to keep board 31, connector 20, and piggyback board 34 mechanically intact. Again, it is apparent that the number of contacts of connector 20 touching a given strip on board 31 is proportionate to the width of such strip. Also, it is apparent that connector 20 is adaptable to an infinite number of center-to-center conductive strip spacings.

Figure 5:
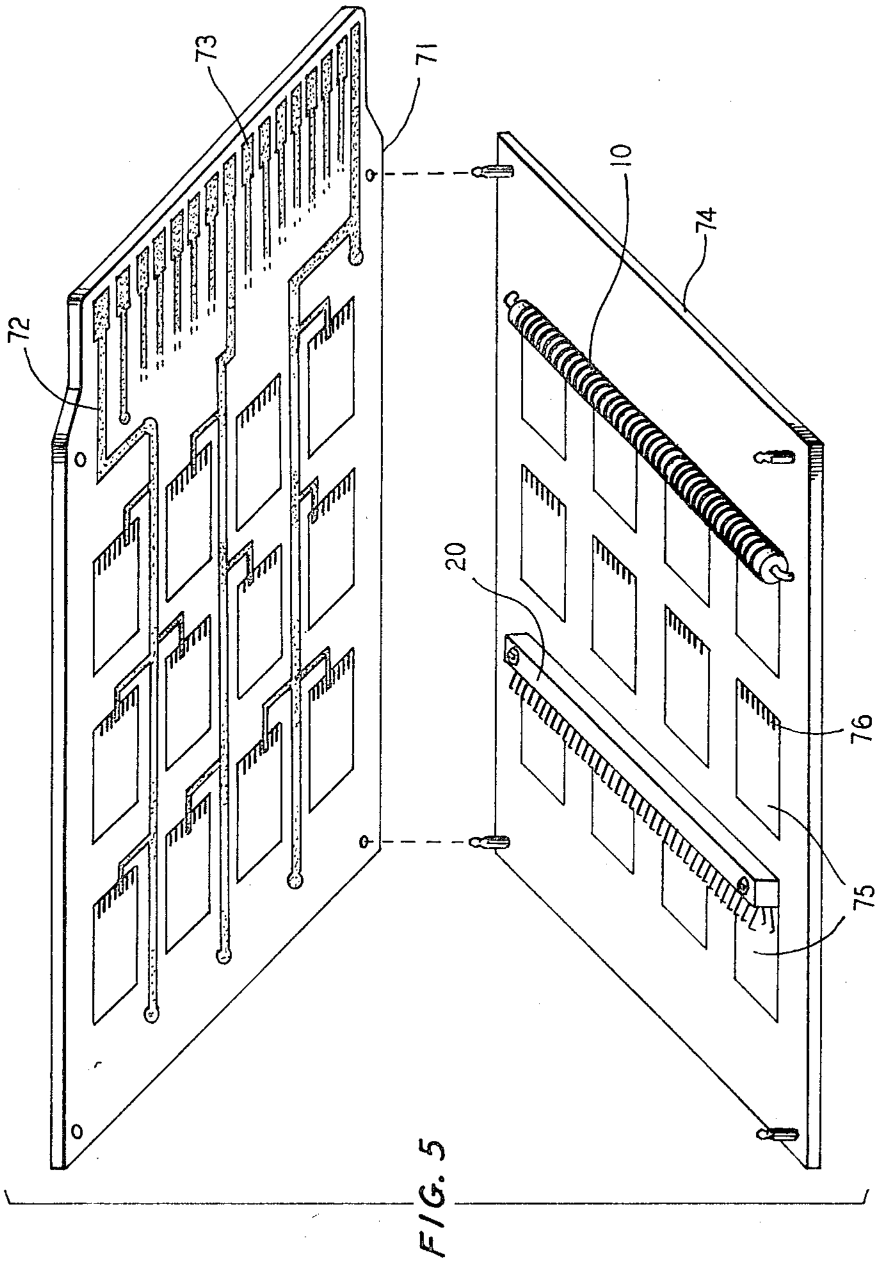
FIG. 5 is a perspective view of an assembly of in-line integrated circuit ceramic substrates arranged for connection to a conventional master printed circuit board according to the present invention.

FIG. 5 is a perspective view of an assembly of in-line integrated circuit ceramic substrates 75 arranged for connection to conventional master printed circuit board 71 according to the present invention. Board 71 comprises conductive strips 72 and widened terminal strips 73, which are for external connection. Substrates 75, which are mounted on baseboard 74, do not have attached thereto the beam leads or lead frames which are generally required in conventional structures. In addition, substrates 75 may each contain a plurality of integrated circuits. Also substrates 75 may be attached to baseboard 74 by using an adhesive or by merely inserting the substrates into recesses on board 74. For illustrative purposes, both types of connectors 10 and 20 are shown. These connectors connect the input and output terminals 76 of the individual substrates to respective conductors 72 on master board 71. Board 71 is adapted to be attached to board 74 by the use of appropriate fastening means and spacers as previously described. The resulting structure has the advantages of high-density packing and easy assembly and disassembly, which allows for replacement of individual substrates without damage to adjoining substrates. Also, the structure shown is adaptable to stacking techniques. For instance, a second board similar to 74 can be stacked on top of board 71, in which case board 71 would be conductive strips on both sides thereof.

Figure 6:
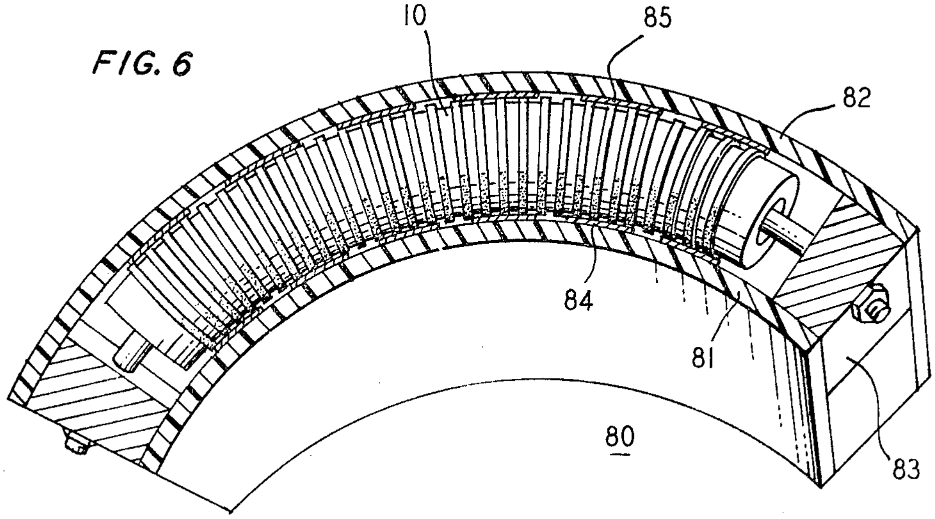
FIG. 6 shows the connector of FIG. 1 utilized to connect conductive strips on two curved surfaces.

FIG. 6 shows the connector of FIG. 1 utilized to connect conductive strips on two curved surfaces. Circuit package 80 comprises circuit boards 81 and 82 having attached thereto strips 84 and 85, respectively. Since connector 10 is resilient, it conforms to the curved surfaces of the two boards to be interconnected. The number of conductors at each interface and the mounting of connector 10 to either printed circuit board are apparent in light of prior discussion. Structure 80 is applicable to cases where there are constraints on the shape of the space in which the electronic circuits are placed. For instance, structure 80 may be useful in packaging electronic components in a cylindrical missile body.

It will be noted that connector 10 is resilient and is thus readily adaptable to linearly distributed conductive strips on flat surfaces, as in FIG. 5; to circularly distributed strips on flat surfaces, as in FIG. 3A; and to linearly distributed strips on curved surfaces, as in FIG. 6. In addition, connectors 10 and 20 can be manufactured in standard lengths which thereafter can be cut down to the length needed for a particular application. Finally, none of the structures heretofore described require soldering during assembly or disassembly.

While the arrangement according to this invention for connecting conductive strips on two uniformly spaced surfaces has been described in terms of specific illustrative embodiments, it will be apparent to one skilled in the art that many modifications are possible within the spirit and scope of the described invention.

What is claimed is:

1. In an apparatus having uniformly spaced surfaces with interconnecting conductive strips thereon, the improvement comprising:
   an electrically nonconductive body, and
   a plurality of discrete contact means arranged in parallel-spaced relationship along the length of said body,
   the minimum width of a strip being greater than the maximum spacing between two adjacent contact means, and
   the minimum spacing between two adjacent strips being greater than the maximum width of a single contact means.

2. Apparatus according to claim 1 wherein
   said body comprises a resilient tube, and
   said contact means comprise circular strips affixed to the external surface of said tube.

3. Apparatus according to claim 1 wherein
   said body comprises a rigid block, and
   said contact means comprise pairs of spring contact elements projecting in parallel planes from said block.

4. Apparatus according to claim 2 wherein
said tube is axially restrained and fixedly mounted onto one of said surfaces.

5. Apparatus according to claim 2 wherein
said surfaces are curved surfaces with a common center of curvature.

6. Apparatus according to claim 3 wherein
said block supports said surfaces.

7. In combination with a plurality of integrated circuit ceramic substrates, each having on one edge conductive strips serving as input and output terminals, a baseboard having said substrates mounted thereon, said edges being placed end to end to form a substantially continuous curve, and a printed circuit board having conductive strips on at least one surface thereof, a flexible connector placed along said curve for providing electrical contact between corresponding conductive strips on said substrates and said printed circuit board comprising an electrically nonconductive resilient tube, and a plurality of circular strips affixed to the external surface of said tube in parallel-spaced relationship along the length thereof.

* * * * *